United States Patent
Lee et al.

(10) Patent No.: US 10,916,826 B2
(45) Date of Patent: Feb. 9, 2021

(54) COMMUNICATION DEVICE AND ANTENNA WITH DYNAMIC ANTENNA TUNING

(71) Applicant: MOTOROLA SOLUTIONS, INC., Chicago, IL (US)

(72) Inventors: Wai Mun Lee, Perak (MY); Alexander Oon, Pulau Pinang (MY); Wooi Ping Teoh, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/223,432

(22) Filed: Dec. 18, 2018

(65) Prior Publication Data
US 2020/0194867 A1 Jun. 18, 2020

(51) Int. Cl.
*H01Q 1/08* (2006.01)
*H01Q 1/10* (2006.01)
(Continued)

(52) U.S. Cl.
CPC ............ *H01Q 1/088* (2013.01); *H01Q 1/10* (2013.01); *H01Q 1/244* (2013.01); *H01Q 1/245* (2013.01); *H04B 1/005* (2013.01); *H04B 1/0064* (2013.01); *H04B 1/0458* (2013.01); *H04B 1/18* (2013.01); *H04B 1/3816* (2013.01); *H04B 1/3833* (2013.01); *H04B 1/401* (2013.01); *H04B 7/02* (2013.01)

(58) Field of Classification Search
CPC .................................................... H04B 1/005
See application file for complete search history.

(56) References Cited

U.S. PATENT DOCUMENTS

| | | | |
|---|---|---|---|
| 5,661,496 A | 8/1997 | Baek et al. | |
| 5,754,628 A | * 5/1998 | Bossi | H04M 1/654 |
| | | | 379/102.02 |

(Continued)

OTHER PUBLICATIONS

Salpavaara, T., "Inductively Coupled Passive Resonance Sensors: Readout Methods and Applications" (2018) Tampere University of Technology; Mar. 1, 2018; downloaded from https://tutcris.tut.fi/portal/en/publications/inductively-coupled-passive-resonance-sensors(09d462ee-dabd-4b2c-8b49-985dd6e28026)/export.html.
(Continued)

*Primary Examiner* — Hsinchun Liao
(74) *Attorney, Agent, or Firm* — Perry + Currier, Inc.

(57) ABSTRACT

A communication device and a detachable antenna with dynamic antenna tuning is provided. The detachable antenna comprises: an electrically insulating base; a main antenna and a first antenna element, at the base, respectively operable at independent first and second given frequencies. The device further comprises: a memory associating the first and second given frequencies; an antenna port configured to detachably receive the base of the detachable antenna; a second antenna element, at the antenna port, operable to wirelessly interact with the first antenna element when the base of the detachable antenna is received at the antenna port; a circuit configured to detect wireless interactions between the second antenna element and the first antenna element; and a controller configured to: select the first given frequency using the second given frequency, as detected via the circuit; and, thereafter wirelessly communicate via the main antenna operated at the first given frequency.

15 Claims, 7 Drawing Sheets

(51) Int. Cl.
*H01Q 1/24* (2006.01)
*H04B 1/00* (2006.01)
*H04B 7/02* (2018.01)
*H04B 1/401* (2015.01)
*H04B 1/04* (2006.01)
*H04B 1/18* (2006.01)
*H04B 1/3827* (2015.01)
*H04B 1/3816* (2015.01)

(56) References Cited

U.S. PATENT DOCUMENTS

| | | | |
|---|---|---|---|
| 5,969,684 A | 10/1999 | Oh et al. | |
| 6,097,341 A | 8/2000 | Saito | |
| 6,118,408 A * | 9/2000 | Yang | H01Q 1/243 343/702 |
| 7,098,850 B2 | 8/2006 | King et al. | |
| 8,018,386 B2 | 9/2011 | Qi et al. | |
| 8,472,904 B2 | 6/2013 | White | |
| 2002/0145526 A1 * | 10/2002 | Friedman | A61B 5/1113 340/573.5 |
| 2004/0127247 A1 | 7/2004 | Reece et al. | |
| 2004/0257284 A1 | 12/2004 | Rada et al. | |
| 2007/0091988 A1 * | 4/2007 | Sadri | H04B 1/0057 375/219 |
| 2007/0142001 A1 | 6/2007 | Sanders | |
| 2014/0055307 A1 | 2/2014 | Petrucci et al. | |
| 2014/0225790 A1 | 8/2014 | Levin et al. | |
| 2019/0182779 A1 | 6/2019 | Niu | |

OTHER PUBLICATIONS

Salpavaara, T., "Inductively Coupled Passive Resonance Sensors: Readout Methods and Applications" (2018) Tampere University of Technology; downloaded from http://www.tut.fi/tutcris.

ISA/EP, International Search Report and Written Opinion re PCT International Patent Application No. PCT/US2019/062333, dated Aug. 4, 2020.

* cited by examiner

COMMUNICATION DEVICE AND ANTENNA WITH DYNAMIC ANTENNA TUNING

BACKGROUND OF THE INVENTION

Some communication devices, that communicate wirelessly using antennas, include detachable and/or interchangeable antennas that operate at different frequencies (e.g. via different resonance lengths, and the like). However, when an antenna is swapped, a communication unit, such as a transceiver, must be tuned to the frequency of the new antenna.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
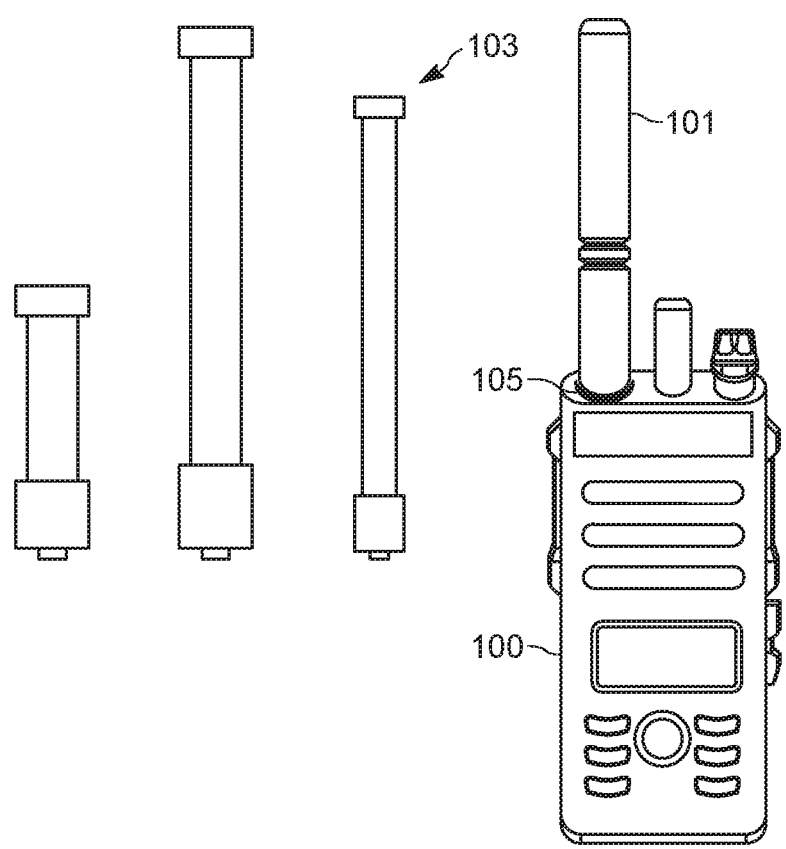
FIG. 1 depicts a communication device with dynamic antenna tuning as well as detachable antennas therefor, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some communication devices, that communicate wirelessly using antennas, include detachable and/or interchangeable antennas that operate at different frequencies (e.g. via different resonance lengths, and the like). However, when an antenna is swapped, a communication unit, such as a transceiver, must be tuned to the frequency of the new antenna. For example, when a first antenna, that operates at a first frequency, is detached and a second antenna, that operates at a second frequency is attached, a manual selection of the second frequency generally occurs, for example via an input device, to manually cause a communication unit (e.g. a transceiver) at the communication device to tune from the first frequency to the second frequency. When the manual selection is incorrect, the communication unit may attempt to operate the second antenna at an incorrect frequency which may lead to data not being transmitted or received, and/or degraded communications, such as degraded field range performance and/or degraded reception and/or degraded signal strength and/or choppy audio. Furthermore, a radio-frequency power amplifier may degrade and/or operate inefficiently as the amplifier attempts to compensate for a poor signal by increasing power and/or current of the communication unit, which may lead to overheating and/or a power slump. Furthermore, such communication devices may include radios, and the like, used by first responders and other types of emergency service personnel. Hence, when a communication device is attempting to operate at a frequency incompatible with a received antenna, a mission-critical situation may become worse as a user of the communication device may not be able to receive or convey mission-critical information An aspect of the specification provides a communication device comprising: a detachable antenna comprising: a base of electrically insulating material; an antenna operable at a first given frequency; and a first antenna element, at the base, operable at a second given frequency independent of the first given frequency of the antenna; a memory storing an association between the first given frequency and the second given frequency; an antenna port configured to detachably receive the base of the detachable antenna; a second antenna element, at the antenna port, operable to wirelessly interact with the first antenna element when the base of the detachable antenna is received at the antenna port; a circuit configured to detect wireless interactions between the second antenna element and the first antenna element; and a controller configured to: select the first given frequency from the memory using the second given frequency as detected via the circuit; and, thereafter wirelessly communicate via the antenna operated at the first given frequency.

Another aspect of the specification provides a detachable antenna comprising: a base of electrically insulating material; an antenna, extending from the base, the antenna operable at a first given frequency; and an antenna element located at the base, the antenna element operable at a second given frequency independent of the first given frequency of the antenna, the antenna element being one or more of electrically floating and electrically decoupled from the antenna.

Attention is directed to FIG. 1, which depicts a perspective view of an example communication device 100 with dynamic antenna tuning. The communication device 100 is interchangeably referred to hereafter as the device 100. The device 100, as depicted, includes a detachable antenna 101 attached thereto. The device 100, as depicted, may be provided with a plurality of detachable antennas 103, for example in addition to the detachable antenna 101 and/or in a kit with the device 100 and/or the detachable antenna 101. Each of the detachable antennas 101, 103 generally operate at a different respective frequency and include components detectable by the device 100 which enable the device 100 to determine a respective operating frequency of a detachable antenna 101, 103 (e.g. when detachable antenna 101, 103 is attached to the device 100), as described in more detail below. As depicted, the device 100 further comprises an optional light emitting component 105 which may be controlled to emit a given color of light based on a determined frequency of a detachable antenna 101, 103 attached to the device 100.

While three detachable antennas 103 are depicted, the device 100 may be provided with any suitable combination of one or more of the detachable antennas 101, 103.

As depicted, the device 100 comprises a land-mobile radio, for example used by first responders; however the device 100 may comprise any suitable communication device configured to receive detachable antennas, including, but not limited to, push-to-talk (PTT) radios, a citizen's broadband radio service (CBRS) radio and the like. Furthermore, while the device 100 as depicted is a mobile device, in other examples the device 100 may not be mobile and/or may be adapted for use in a vehicle.

Figure 2:
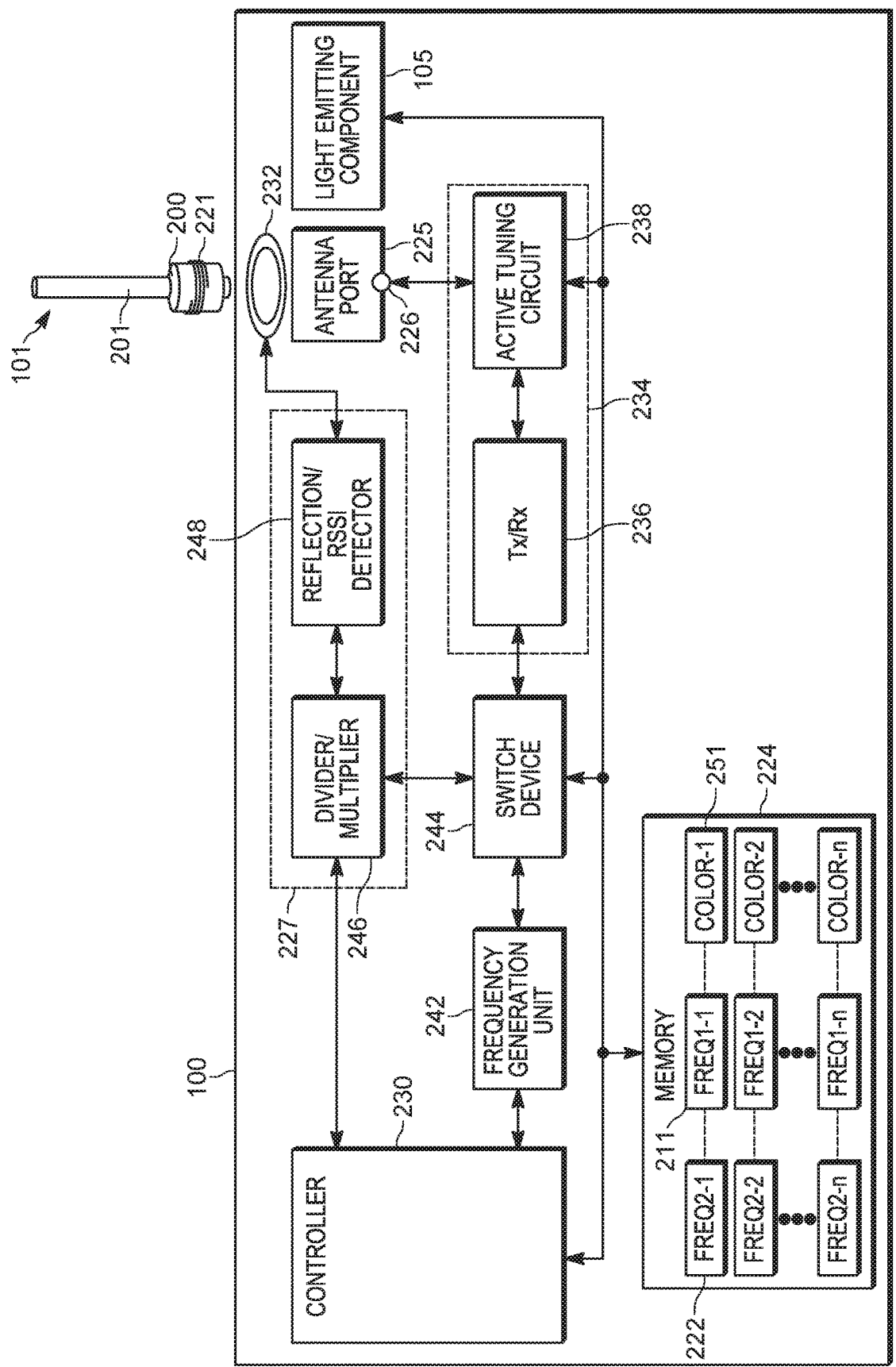
FIG. 2 is a device diagram showing a device structure of a communication device with dynamic antenna tuning, in accordance with some examples.

Attention is next directed to FIG. 2, which depicts a schematic block diagram of an example of the device 100 and the detachable antenna 101. As depicted, the detachable antenna 101 is detached from the device 100, however, as will be described below, and as also shown in FIG. 1, the detachable antenna 101 is generally attachable to the device 100.

The detachable antenna 101 is first described. In general, the detachable antenna 101 comprises: a base 200 of electrically insulating material; an antenna 201 (and/or a main antenna) operable at a first given frequency 211; and a first antenna element 221, at the base 200, operable at a second given frequency 222 independent of the first given frequency of the main antenna 201.

In particular, the first antenna element 221 is one or more of: electrically floating and electrically decoupled from the main antenna 201. Hence, for example, when the main antenna 201 resonates at the first given frequency 211, the first antenna element 221 does not resonate and/or when the first antenna element 221 resonates at the second given frequency 222, the main antenna 201 does not resonate.

The first given frequency 211 of the main antenna 201 is generally selected based on desired operating frequencies of the device 100, which may be determined based on operating frequencies of available wireless communication networks in a region where the device 100 is to be deployed. For example, when the device 100 is to be used by first responders, the first given frequency 211 of the main antenna 201 may be an operating frequency of a first responder wireless communication network and/or a public safety wireless communication network in a region where the device 100 is to be deployed.

As depicted, the first antenna element 221 comprises a coil of an electrically conducting material located at the base 200, the coil being concentric with a base-end of the main antenna 201 (and/or the base 200) and electrically insulated therefrom via the electrically insulating material of the base 200. For example, as depicted, each of the base 200 and the base-end of the main antenna 201 are cylindrically symmetrical, with the coil of the first antenna element 221 being concentric with each of the base 200 and the base-end of the main antenna 201. The base-end of the main antenna 201 of the main antenna 201 is an end of the main antenna 201 which extends through the base 200 such that when the base 200 is used to attach the detachable antenna 101 to the device 100, the base-end of the main antenna 201 may connect with an antenna feed in the device 100, as described in more detail below. However, the first antenna element 221 may have a configuration other than a coil concentric with the base 200 and/or the base-end of the main antenna 201 of the main antenna 201; for example, the first antenna element 221 may comprise a coil that is offset from and/or adjacent the base 200 and extending perpendicular therefrom with respective axes of the base 200 and the first antenna element 221 being about parallel with each other.

Alternatively, the first antenna element 221 may comprise a strip of electrically conducting material have a specific resistance value, the length and the resistance value of the strip selected such that the first antenna element 221 resonates at the second given frequency 222.

Regardless of configuration, the first antenna element 221 is operable at the second given frequency 222 independent of the first given frequency 211 of the main antenna 201, the first antenna element 221 being one or more of electrically floating and electrically decoupled from the main antenna 201.

Returning to the coil, the coil of the first antenna element 221 is selected to be of a length which resonates at the second given frequency 211. Furthermore, as depicted, the coil of the first antenna element 221 is concentric with the base-end of the main antenna 201, and the electrically insulating material of the base 200 is located between the coil and the base-end of the main antenna 201 to electrically insulate the coil from the main antenna 201.

As will be explained in further detail below, in some examples, the detachable antenna 101 further comprises an electrically insulating antenna element holder (not depicted in FIG. 2: for example see FIG. 6B), and the coil of the first antenna element 221 may be embedded in the antenna element holder, with the antenna element holder holding the coil of the first antenna element 221 around the base 200, concentric with the base-end of the main antenna 201. However, any mechanism for attaching the first antenna element 221 around the base 200 is within the scope of the present examples.

Alternatively, the first antenna element 221 may be embedded in the electrically insulating material of the base 200.

Furthermore, as will be described below, the base 200 is generally configured for insertion into an antenna port of the communication device 100, and the first antenna element 221 is configured to resonate at the second given frequency 222 in response to a wireless interaction with a respective antenna element of the communication device 100 when the base 200 is inserted into the antenna port thereof.

While not depicted, the detachable antenna 101 may further include a case and/or a housing encasing the components of the detachable antenna 101.

Each of the detachable antennas 103 has a structure similar to the example detachable antenna 101 depicted in FIG. 2; however each of the detachable antennas 101, 103 are configured with different first frequencies for respective antennas and different second frequencies for first antenna elements.

In general, the device 100 comprises: the detachable antenna 101; a memory 224 storing an association between the first given frequency 211 and the second given frequency 222; an antenna port 225 configured to detachably receive the base 200 of the detachable antenna 101; a second antenna element 232, at the antenna port 225, operable to wirelessly interact with the first antenna element 221 when the base 200 of the detachable antenna 101 is received at the antenna port 225; a circuit 227 configured to detect wireless interactions between the second antenna element 232 and the first antenna element 221; and a controller 230 configured to: select the first given frequency 211 from the memory 224 using the second given frequency 222 as detected via the circuit 227; and, thereafter wirelessly communicate via the main antenna 201 operated at the first given frequency 211.

While the memory 224 stores an association between the first given frequency 211 and the second given frequency 222 (for example in a database format, a table format, and the like), as depicted, the memory 224 stores respective associations between respective first given frequencies "Freq1" and respective second given frequencies ("Freq2") for a plurality of detachable antennas, for example each of the detachable antennas 101, 103. In particular, each of the detachable antennas 103 comprises a respective antenna (e.g. similar to the main antenna 201) operable at a respective first given frequency, and a respective first antenna element (e.g. similar to the first antenna element 221) operable at a respective second given frequency independent of the respective first given frequency of the respective antenna.

Hence, when the device 100 is provided with, and/or is compatible with, a number "n" of detachable antennas 101, 103, the memory 224 stores a plurality of first frequencies "Freq1-1", "Freq1-2" . . . "Freq1-n" which indicate the respective operating frequencies and/or resonant frequencies of the respective antennas of "n" detachable antennas 101, 103.

Each of the plurality of first frequencies "Freq1-1", "Freq1-2" . . . "Freq1-n" is stored in association with a respective second given frequency "Freq2-1", "Freq2-2" . . . "Freq2-n" which indicate the respective operating frequencies and/or resonant frequencies of the respective first antenna element of the detachable antennas 101, 103. Associations between the data stored in the memory 224 are indicated in FIG. 2 via dashed lines therebetween. Hence, in a particular example, the frequency "Freq1-1" is the first given frequency 211 of the main antenna 201 and the associated frequency "Freq2-1" is the second given frequency 222 of the first antenna element 221.

However, the memory 224 may store as few as one set of a first frequency and a second frequency (e.g. for use with the detachable antenna 101), and/or the memory 224 the memory 224 may store many sets of first frequencies and second frequencies corresponding to a plurality of detachable antennas 101, 103 which may be used with the device 100. For example, the device 100 may be provided with a given number of detachable antennas 101, 103, but the device 100 may be compatible with a larger number of detachable antennas 101, 103, which may be obtained and/or purchased after the device 100 and the given number of detachable antennas 101, 103 are first obtained. The memory 224 may store sets of first frequencies and second frequencies for all available detachable antennas 101, 103 and/or the memory 224 may be updated to store additional sets of first frequencies and second frequencies as more detachable antennas 101, 103 are obtained.

In these examples (e.g. when the memory 224 stores more than one set of first frequencies and second frequencies), the controller 230 is further configured to: control the circuit 227 to scan the second antenna element 232 over a range of frequencies, including the respective second given frequencies (e.g. as stored at the memory 224), to detect the second given frequency 222; and select the first given frequency 211 from the respective first given frequencies stored at the memory 224 using the second given frequency 222 as compared with the respective second given frequencies stored at the memory 224. Indeed, the controller 230 is generally configured to: control the circuit 227 to scan the second antenna element 232 over a range of frequencies that may include all the second given frequencies as stored at the memory 224.

In general, the antenna port 225 includes an electrically insulated housing that include an aperture (not depicted), and the like, into which the base 200 of the detachable antenna 101 is insertable.

Furthermore, in some examples, as depicted, the second antenna element 232 comprises a ring of an electrically conducting material located around the electrically insulated housing of the antenna port 225. For example, the second antenna element 232 may comprise a conductive sleeve ring and the like.

The aperture the antenna port 225 is generally complementary to the base 200. Hence, when the base 200 of the detachable antenna 101 is inserted into the antenna port 225, the antenna port 225 engages the base 200 such that the base-end of the main antenna 201 is electrically connected with an antenna feed 226 of the device 100, as depicted located in the antenna port 225. The base 200 may include any suitable alignment components and/or mechanical components to releasably engage and/or frictionally engage the base 200, such that the detachable antenna 101 is detachable from the antenna port 225. For example, the base 200 and/or the base-end of the main antenna 201 may be threaded and the antenna port 225 may include complementary threads and/or an "antenna nut" with complementary threads such that the detachable antenna 101 "screws" into the antenna port 225.

Furthermore, when the base 200 of the detachable antenna 101 is inserted into the antenna port 225 and/or when the antenna port 225 engages the base 200, the first antenna element 221 and the second antenna element 232 are held at a distance from each other. In particular, when the base 200 of the detachable antenna 101 is engaged with the antenna port 225, the ring of the second antenna element 232 is adjacent to the coil of the first antenna element 221, with the base 200 inserted through the ring of the second antenna element 232, such that respective axes of the ring of the second antenna element 232 and the coil of the first antenna element 221 are aligned.

Indeed, when the first antenna element 221 is offset from and/or adjacent the base 200, the position of the second antenna element 232 is adapted accordingly, for example to embed the second antenna element 232 in a housing of the device 100 adjacent to the aperture of the antenna port 225.

Furthermore, the dimensions of the base 200 and the antenna port 225 are selected such that the distance at which the first antenna element 221 and the second antenna element 232 are held from each other enables the first antenna element 221 and the second antenna element 232 to wirelessly communicate. For example, at the distance, the first antenna element 221 is in a radiating range of the second antenna element 232, and vice versa.

Furthermore, the first antenna element 221 and the second antenna element 232 are generally separated by electrically insulating material (e.g. of one or more of the antenna port 225 and/or the base 200 and/or an antenna element holder) such that the first antenna element 221 and the second antenna element 232 do not short; in some examples, the first antenna element 221 and the second antenna element 232 may be separated by an air gap. Indeed, the second antenna element 232 is generally electrically isolated from the device 100.

In general, the circuit 227 may be further configured to detect the wireless interactions between the second antenna element 232 and the first antenna element 221 element by scanning the second antenna element 232 over a range of frequencies, including the second given frequency 222, as described in more detail below.

Similarly, the controller 230 may be further configured to: control the circuit 227 to scan the second antenna element 232 over a range of frequencies, including the second given frequency 222; and detect, via the circuit 227, the second given frequency 222 of the first antenna element 221 via the wireless interactions between the second antenna element 232 and the first antenna element 221. The circuit 227 is described in more detail below.

As depicted, the device 100 further comprises a communication unit 234 configured to wirelessly communicate via the main antenna 201 when the base 200 of the detachable antenna 101 is received at the antenna port 225. Hence, the controller 230 is further configured to wirelessly communicate via the main antenna 201 operated at the first given frequency 211 via the communication unit 234.

For example, as depicted, the communication unit 234 comprises a transmitter/receiver circuit 236 (such as a transceiver and the like) configured to transmit and receive data (e.g. encoded in wireless signals) via the main antenna 201 when the base 200 of the detachable antenna 101 is received at the antenna port 225. Furthermore, as depicted, the communication unit 234 further comprises an active tuning circuit 238, between the transmitter/receiver circuit 236 and the antenna port 225, the active tuning circuit 238 configured to be tuned to the first given frequency 211 to enable the transmitter/receiver circuit 236 to transmit and receive data (e.g. encoded in wireless signals) via the main antenna 201 at the first given frequency 211.

The active tuning circuit 238 is generally connected to the antenna feed 226 located in the antenna port 225, which connects to the base-end of the main antenna 201 when the base 200 is inserted into the antenna port 225.

Furthermore, the active tuning circuit 238 may be tuned to match the main antenna 201 at the first given frequency 211 using tuning parameters (not depicted) which may also be stored at the memory 224 (e.g. in association with the first given frequency 211). Indeed, as depicted, the controller 230 is also in communication with the active tuning circuit 238 such that the controller 230 may tune the active tuning circuit 238 using tuning parameters retrieved from the memory 224.

As depicted, the device 100 further comprises a frequency generation unit (FGU), configured to generate frequencies to transmit data and/or to operate the second antenna element 232, and which may include, but is not limited to, a radio-frequency power amplifier (not depicted), and the like.

As depicted, the device 100 further comprises a switch device 244 configured to switch an output from the frequency generation unit 242 between the communication unit 234 and the circuit 227. In these examples, the controller 230 is further configured to: control the switch device 244 to switch the output from the frequency generation unit 242 to the circuit 227 when controlling the circuit 227 to scan the second antenna element 232 over a range of frequencies that includes the second given frequency 222 to detect the second given frequency 222; and control the switch device 244 to switch the output from the frequency generation unit 242 to the communication unit 234 when controller 230 is wirelessly communicating via the main antenna 201 at the first given frequency 211 via the communication unit 234.

For example, returning to the circuit 227, the circuit 227 may comprise one or more of an electrical divider 246 and an electrical multiplier (interchangeably referred to hereafter as the divider 246) to one or more of divide and multiply the output from the frequency generation unit 242 to scan the second antenna element 232 over the range of frequencies that includes the second given frequency 222.

As depicted, the circuit 227 further comprises one or more of a reflection detector 248 and a received signal strength intensity (RSSI) detector (interchangeably referred to hereafter as the detector 248) configured to detect one or more of electrical reflections and RSSI from the second antenna element 232 to detect the wireless interactions between the second antenna element 232 and the first antenna element 221. Operation of the detector 248 will be describe in more detail below with respect to FIG. 3.

As depicted, the device 100 further comprises the light emitting component 105, and in these examples the controller 230 is further configured to: control the light emitting component 105 to emit a given color of light based on the second given frequency 222 as detected via the circuit 227. As depicted, the light emitting component 105 is located at the antenna port 225, however, the light emitting component 105 may be located at any suitable position on the device 100 where a user of the device 100 may view a color output by the light emitting component 105.

In some examples, the light emitting component 105 may comprise one or more light emitting diodes and/or a multicolor light emitting diode configured to output different colors of light. In some of these examples, the light emitting component 105 may include a light-pipe in optical communication with the multi-color light emitting diode (and the like), the light-pipe molded onto a housing of the device 100 and/or the antenna port 225 and which may surround an aperture of the antenna port 225, such that light emitted from the light emitting component 105 is emitted around the aperture of the antenna port 225 (e.g. as depicted in FIG. 1.

Figure 3:
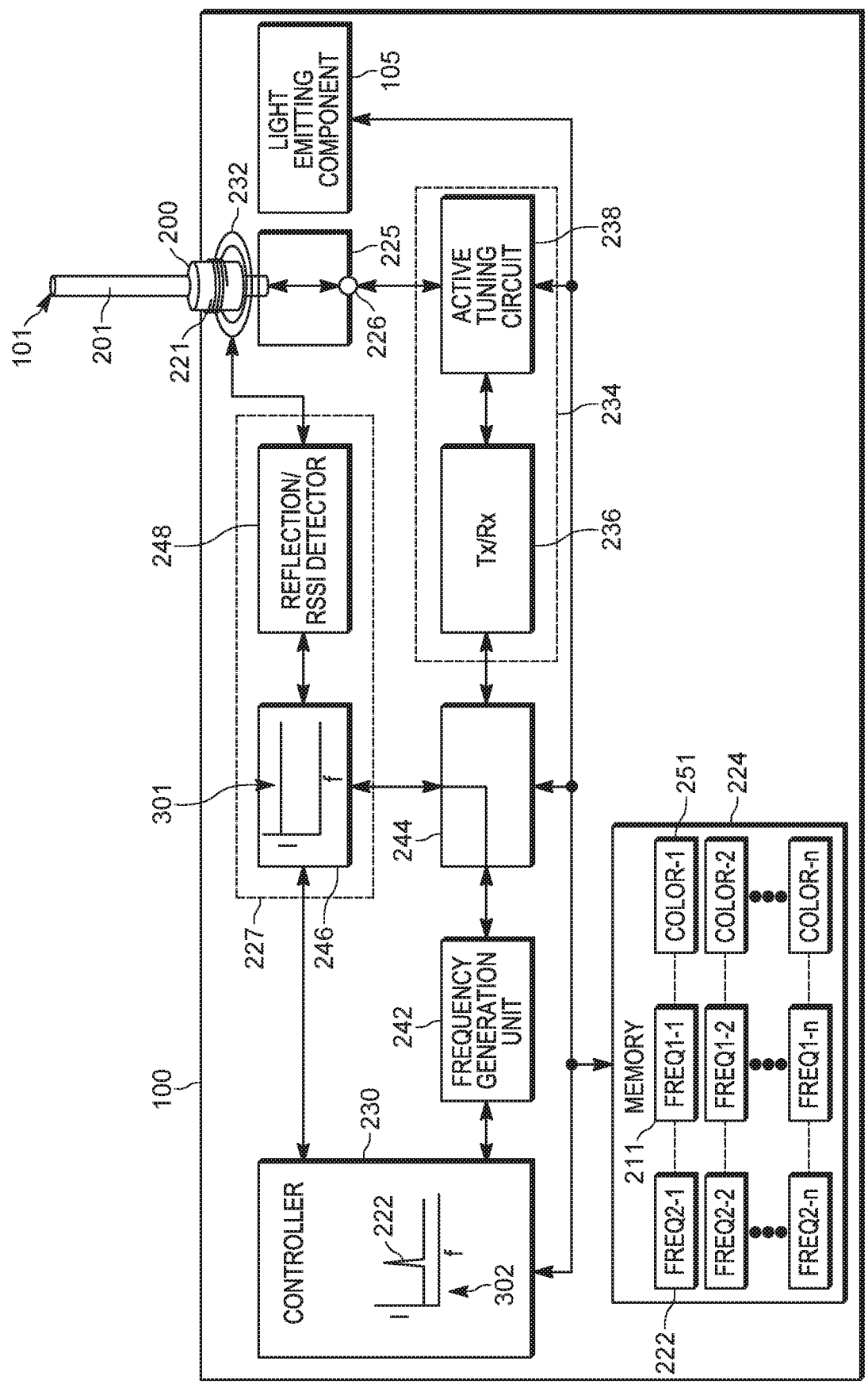
FIG. 3 shows the communication device of FIG. 2 operating in a frequency scanning mode, in accordance with some examples.

As also depicted in FIG. 3, the memory 224 may store a respective color (e.g. "Color-1", "Color-2" . . . "Color-n") in association with each of the first given frequencies and the second given frequencies. For example, the color 251 (e.g. "Color-1") is stored in association with the first given frequency 211 and the second given frequency 222. The stored respective color "Color-1", "Color-2" . . . "Color-n" is a color that the light emitting component 105 is controlled to emit when a respective second given frequency is detected. Hence, for example, when the second given frequency 222 is detected via the circuit 227, the controller 230 controls the light emitting component 105 to emit the color 251.

Each of the colors "Color-1", "Color-2" . . . "Color-n" stored in memory 224 may comprise a current and/or voltage and/or power and/or any other suitable parameters used to control the light emitting component 105 to emit the respective given color. Hence, when the controller 230 is controlling the second antenna element 232 to emit a range of frequencies to detect the second given frequency 222 of the first antenna element 221, and when the second given frequency 222 is detected, the controller 230 retrieves the corresponding parameters stored in the memory 224 (e.g. in "Color-1") to control the light emitting component 105 to emit the color 251. In some examples, the light emitting component 105 is controlled to emit the color 251 while the detachable antenna 101 is attached to the device 100. In other examples, the light emitting component 105 is controlled to emit the color 251 for a given time period, for example 1 minute, and the like; in some examples, the given time period may be configurable at the device 100.

However, when the wireless interactions between the second antenna element and the first antenna element are not detected, the controller 230 is further configured to: control the light emitting component 105 to not emit light. Hence, for example, when the second given frequency 222 is not detected, the light emitting component 105 does not emit light.

In general, the controller 230 may operate the device 100 in two modes, a frequency scanning mode and an operational mode, as described hereafter.

Attention is next directed to FIG. 3 which depicts the controller 230 operating the device 100 in a frequency scanning mode. FIG. 3 is substantially similar to FIG. 2, with like elements having like numbers. However, in FIG. 3, the detachable antenna 101 has been received at the antenna port 225 and hence, for example, the base-end of the main antenna 201 is in electrical connection with the antenna feed 226.

The controller 230 may automatically enter the frequency scanning mode when one or more of: the device 100 is first turned on; and when the controller 230 detects that a previous detachable antenna has been detached, which may occur when no signal and/or a signal below a threshold value is detected at the transmitter/receiver circuit 236 (e.g. an "open" antenna condition is detected).

In the frequency scanning mode, the controller 230 controls the switch device 244 to output the signal from the FGU 242 to the divider 246, depicted in FIG. 3 via a connection within the switch device 244 from the FGU 242 to the divider 246. Hence, in the frequency scanning mode, the communication unit 234 does not receive output from the switch device 244.

The controller 230 controls the FGU 242 to output a signal at a frequency and/or to scan through a range of frequencies, which are output to the divider 246, which divides and/or multiples the output from the FGU 242 to scan through a range 301 of frequencies which includes the second given frequencies "Freq2" stored in the memory 224. The scan of the range 301 of frequencies is output to the detector 248, which outputs the scan of the range 301 of frequencies to the second antenna element 232. The range 301 of frequencies is depicted in FIG. 3 as a graph of intensity "I" vs frequency "f" at the divider 246.

The second antenna element 232 broadcasts and/or wirelessly transmits the scan of the range 301 of frequencies (e.g. as emitted RF power) over a radiating range that includes the first antenna element 221. When the scan of the range 301 of frequencies emits the second given frequency 222, the first antenna element 221 resonates which causes the second antenna element 232 to respond (e.g. via receipt of a signal from the first antenna element 221, and the like), which is detected by the detector 248, for example as an increase in detected RSSI at the second given frequency 222, and/or as a reflection from the second antenna element 232 at the second given frequency 222. Indeed, throughout the scan of the range 301 of frequencies, the detector 248 is detecting RSSI and/or reflections from the second antenna element 232, but the detected RSSI and/or reflections are generally low at frequencies other than at the second given frequency 222.

For example, as depicted, the controller 230 receives indications 302 of RSSI and/or reflections from the range 301 of frequencies, the indications 302 depicted in FIG. 3 as a graph of intensity "I" vs frequency "f" at the controller 230, with a peak at the second given frequency 222. Hence, the controller 230 determines the second given frequency 222 from the indications 302, and operates the device 100 in an operational mode as described below with respect to FIG. 4.

However, when the controller 230 does not detect a second given frequency from the indications 302, the controller 230 may control a notification device (e.g. the light emitting component 105 and/or another notification device) to provide a notification that no detachable antenna was detected. For example, the light emitting component 105 may be controlled to emit "red" and/or another color that does not correspond to the colors "Color-1", "Color-2" . . . "Color-n" stored in memory 224.

The controller 230 may not detect a second given frequency from the indications 302 when one or more of the following occurs: no detachable antenna is attached to the device 100; a detachable antenna attached to the device 100 is counterfeit and/or does not include a first antenna element and/or does not include a first antenna element that resonates inside the range 301; a detachable antenna is attached but incorrectly inserted (e.g. at an angle, and/or not properly tightened and/or inserted and the like) at the antenna port such that the antenna elements 221, 232 are not properly aligned and hence do not wirelessly interact (and/or wirelessly interact such that an RSSI from the first antenna element 221 is too low to detect at the detector 248); and the like.

In some, examples when the controller 230 does not detect a second given frequency, the controller 230 may again scan through the range 301 of frequencies and/or scan through the range 301 of frequencies a given number of times. When the controller 230 does not detect a second given frequency in any of the subsequent scans, the controller 230 may stop scanning. The controller 230 may repeat the scan at a later time, for example when operated by a user interacting with an input device to initiate the scan and/or when the device 100 is turned off and turned back on. Indeed, any suitable initiation of the scan is within the scope of the present specification.

Figure 4:
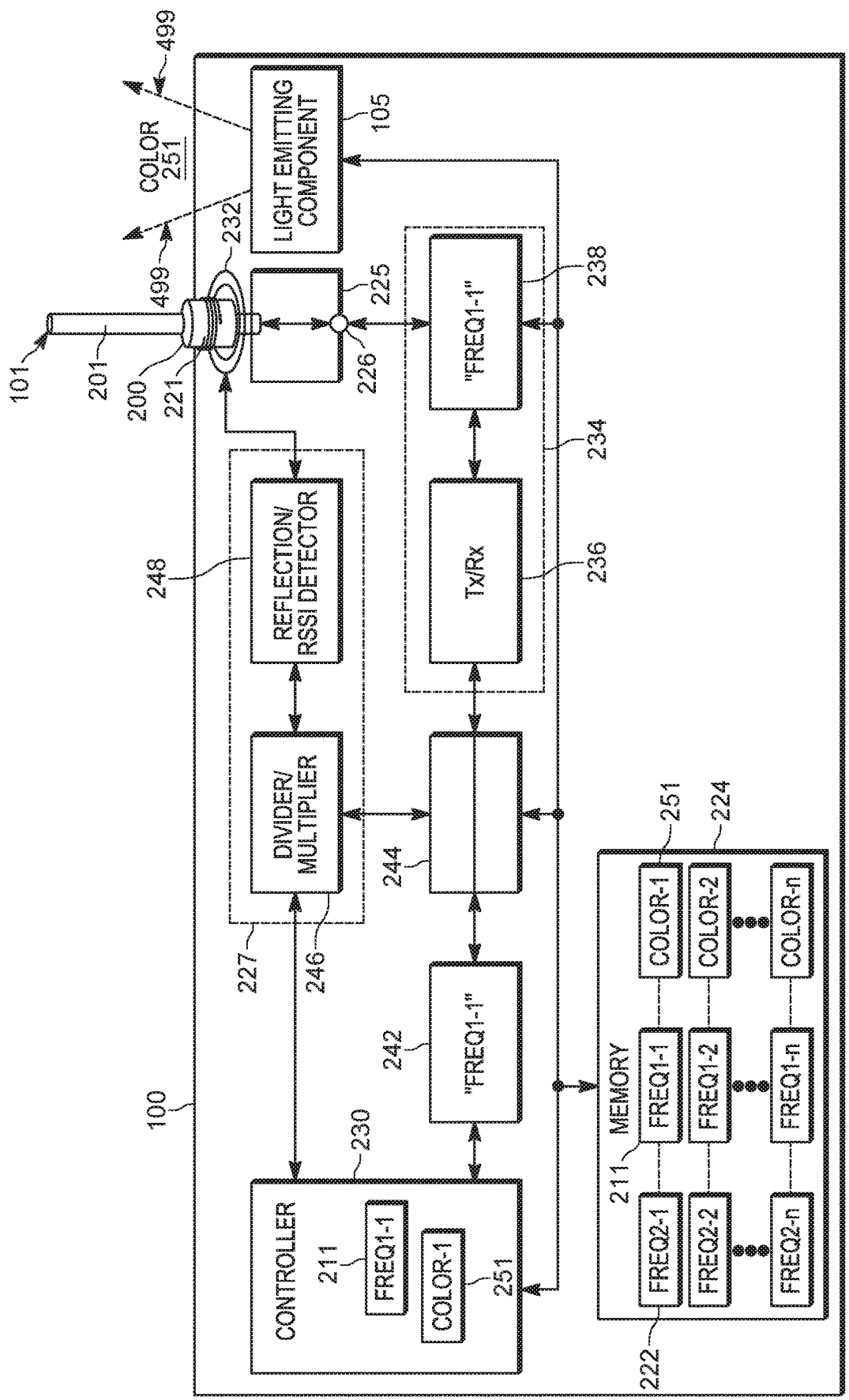
FIG. 4 shows the communication device of FIG. 2 operating in an operational mode in which the communication device has been dynamically tuned to an operating frequency of a detachable antenna based on the frequency scanning mode, in accordance with some examples.

Attention is next directed to FIG. 4 which depicts the controller 230 operating the device 100 in an operational mode in which dynamic tuning to an operating frequency of the detachable antenna 101 occurs based on the frequency scanning mode. FIG. 4 is substantially similar to FIG. 2, with like elements having like numbers. In the operational mode, the controller 230 controls the switch device 244 to output the signal from the FGU 242 to the transmitter/receiver circuit 236, depicted in FIG. 4 via a connection within the switch device 244 from the FGU 242 to the transmitter/receiver circuit 236. Hence, in the operational mode, the circuit 227 does not receive output from the switch device 244.

The controller 230 may automatically enter the operational mode when the controller 230 scans through the range 301 of frequencies and detects a second given frequency, as the second given frequency 222 as described above.

In the operational mode, as depicted, the controller 230 retrieves the first given frequency 211 from the memory 224 using the second given frequency 222 detected during the frequency scanning mode.

The controller 230 uses the first given frequency 211 to control the output from the FGU 242. Specifically, the FGU 242 is controlled to output the first given frequency 211 (e.g. a signal at the first given frequency 211) to the transmitter/receiver circuit 236, which outputs the first given frequency 211 to the active tuning circuit 238. The controller 230 further tunes the active tuning circuit 238 to match the first given frequency 211 using tuning parameters stored in the memory 224. The active tuning circuit 238 outputs the first given frequency 211 to the main antenna 201 of the detachable antenna 101, and the device 100 thereafter communicates via the detachable antenna 101 at the first given frequency 211.

As depicted, the controller 230 may also retrieve the color 251 (e.g. the parameters stored in the "Color-1") from the memory 224 using the second given frequency 222 detected during the frequency scanning mode. The parameters stored in the "Color-1" are used to control the light emitting component 105 to emit 499 the respective color 251. Hence, the light emitting component 105 provides an indication of the first given frequency 211 which the detachable antenna 101 is used to communicate.

While the device 100 has been described with respect to a specific example configuration, other configurations are within the scope of the present specification. For example, in other examples, the device 100 may comprise two FGUs including: a first FGU which outputs frequencies to the communication unit 234 (e.g. without a switch device); and a second FGU which outputs frequencies to the circuit 227 (e.g. without a switch device). In other examples, the divider 246 may be replaced with an FGU (e.g. the FGU 242 and/or an FGU of a two-FGU device) that scans through the range 301 of frequencies.

A specific example of the device 100 will next be described with respect to FIG. 5, FIG. 6A, FIG. 6B, FIG. 6C, and FIG. 7.

Figure 5:
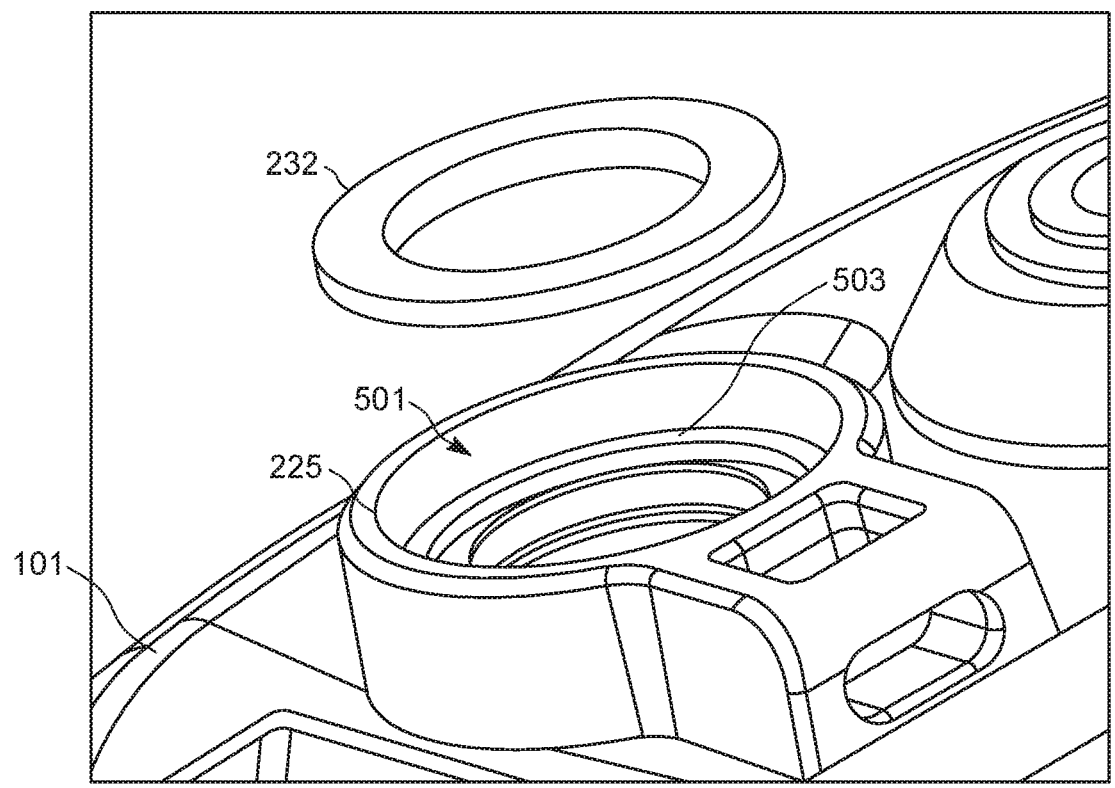
FIG. 5 depicts a depicts a perspective exploded view of a portion of the device of FIG. 1, including an antenna port, with a detachable antenna removed, and a second antenna element positioned above the antenna port, in accordance with some examples.

Attention is next directed to FIG. 5 which depicts a perspective exploded view of a portion of the device 100, in the specific example, the depicted portion including the antenna port 225, with the detachable antenna 101 removed, and the second antenna element 232 positioned above the antenna port 225. As depicted, the antenna port 225 includes an aperture 501 with a shelf 503 onto which the second antenna element 232 rests when inserted into, and/or assembled with, the antenna port 225. In the depicted example, the second antenna element 232 comprises a conductive sleeve ring of a conductive material including, but not limited to, sheet metal, a flexible circuit and the like. Depending on a type of material of the second antenna element 232, the second antenna element 232 may be assembled with the antenna port 225 by any suitable technique such as co-molding, adhesive bonding, mechanical interlock, and the like. While not depicted, the shelf 503 and/or an adjacent side-wall of the antenna port 225 includes an electrical connection to connect the second antenna element 232 to the detector 248.

Figure 6A:
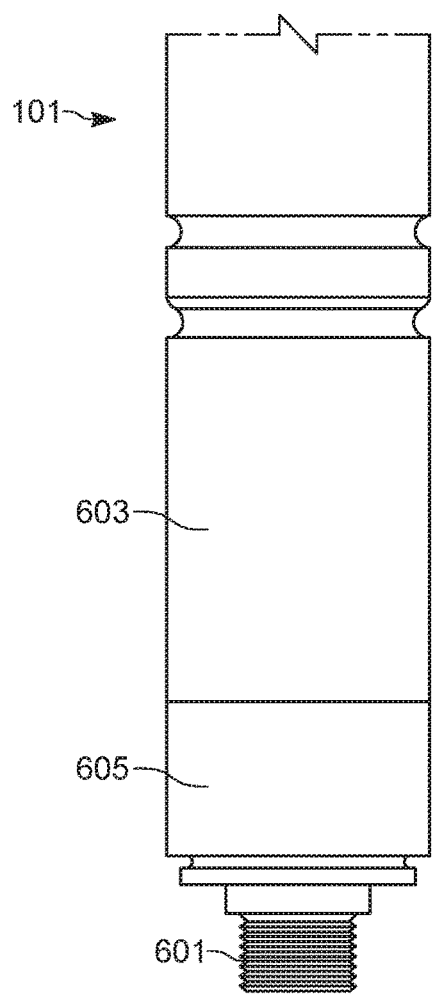
FIG. 6A depicts a perspective view of a base-end of an example detachable antenna, in accordance with some examples.
Figure 6B:
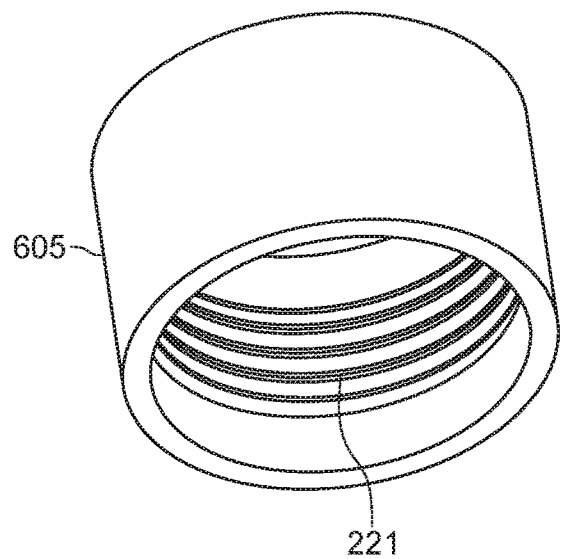
FIG. 6B depicts a perspective view of an antenna element holder of an example detachable antenna, in accordance with some examples.

Attention is next directed to FIG. 6A, FIG. 6B and FIG. 6B which shows an example of the detachable antenna 101 and components thereof.

In particular, FIG. 6A depicts a perspective view of an end of an example of the detachable antenna 101 that includes a base-end 601 of the main antenna 201, the base-end 601 and/or the base 200 being threaded such that the base-end 601 may screw into complementary threads of the antenna port 225. FIG. 6A further depicts a casing 603 that encases the components of the detachable antenna 101; hence, in the FIG. 6A, the main antenna 201 and the first antenna element 221 are not visible as at least the main antenna 201 is encased in the casing 603. The base 200 is further understood to be interior to the casing 603, though the depicted threads of the base-end 601 may be provided at the base 200.

FIG. 6A further depicts an antenna element holder 605 which is attached to the casing 603 and/or the base 200, and which is located adjacent the base-end 601.

FIG. 6B depicts a perspective view of the antenna element holder 605 which depicts an interior of the antenna element holder 605 showing that the first antenna element 221 is embedded at, and/or located at, an interior wall of the antenna element holder 605. In particular, the antenna element holder 605 may comprise a hollow cylinder, and the like, with the first antenna element 221 embedded at, and/or located at, an interior wall thereof. The antenna element holder 605 may be made from any suitable electrically insulating material, including, but not limited to, plastic, and the like.

Figure 6C:
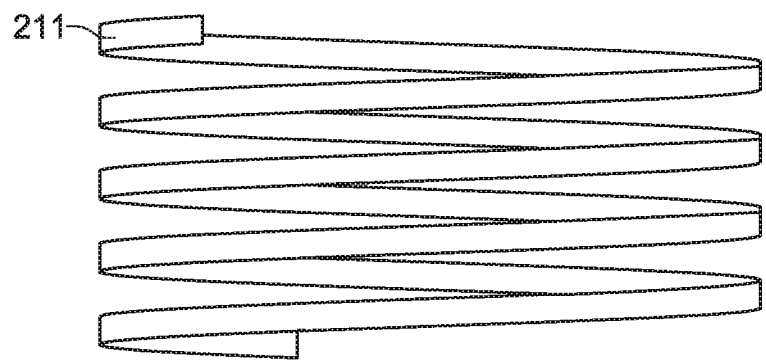
FIG. 6C depicts an example antenna element of an example detachable antenna, in accordance with some examples.

FIG. 6C depicts an example of the first antenna element 221 showing the coil structure.

For example, the first antenna element 221 may be pre-assembled into the antenna element holder 605. The first antenna element 221 may be made from any suitable conductive material, including, but not limited to, sheet metal, a copper foil, flexible circuit, conductive plastic and the like. While as depicted, the first antenna element 221 comprises a coil, alternatively, the first antenna element 221 may comprise a strip with a specific resistance value such that the first antenna element 221 resonates at the second given frequency 222.

The antenna element holder 605 with the first antenna element 221 may be assembled via molding and/the like, and the antenna element holder 605 with the first antenna element 221 may be assembled into detachable antenna 101 using any suitable technique including, but not limited to, co-molding, adhesive bonding, mechanical interlocking, and the like. The first antenna element 221 is hence encased in electrically insulating material and hence is floats electrically with respect to both the main antenna 201 and the device 100. In particular, when the detachable antenna 101 is attached to the device 100, the first antenna element 221 has no electrical connectivity to the device 100 but wirelessly interacts with the second antenna element 232.

Figure 7:
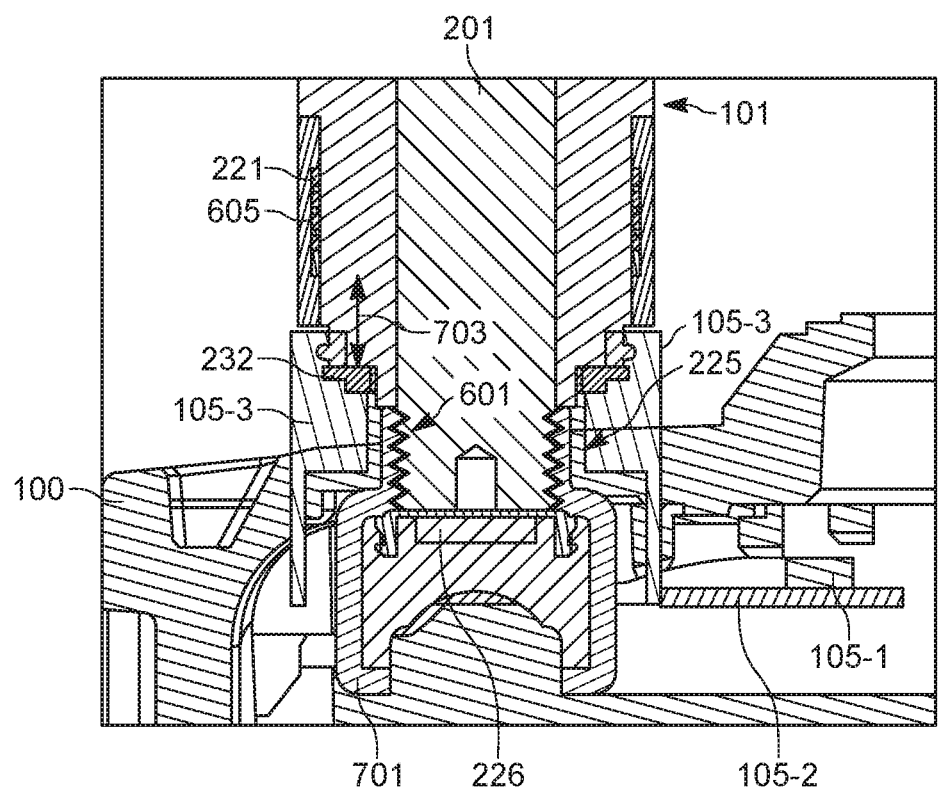
FIG. 7 depicts a schematic cross-section of a portion of a communication device that includes an antenna port with a detachable antenna attached thereto, to the antenna port, in accordance with some examples.

Attention is next directed to FIG. 7 which depicts a portion of the device 100 in schematic cross-section The depicted portion includes the antenna port 225, with the detachable antenna 101 attached to the antenna port 225. As depicted, threads of the base-end 601 of the main antenna 201 are screwed into complementary threads of an antenna nut 701 located in the antenna port 225, with the base-end 601 making electrical contact with the antenna feed 226. The first antenna element 221 is positioned at a distance 703 from the second antenna element 232 such the first antenna element 221 and the second antenna element 232 are each within each other's radiating ranges so that they may wirelessly interact. Furthermore, as depicted, cylindrical axes of the coil of the first antenna element 221 and the ring of the second antenna element 232 are aligned.

Details of an example of the light emitting component 105 are also depicted. For example, as depicted, the light emitting component 105 comprises a multicolor light emitting diode (LED) 105-1 with a first light pipe 105-2 conveying light from the LED 105-1 to a second light pipe 105-3 which is co-molded on a housing of device 100 and/or co-molded with the antenna port 225, such that the second light pipe 105-3 surrounds the aperture of the antenna port 225 into which the detachable antenna 101 is inserted. Hence, when the LED 105-1 is controlled to a given color (e.g. based on a detected first given frequency of the first antenna element 221 or another first antenna element of another detachable antenna), the given color is emitted from the second light pipe 105-3.

Provided herein is a communication device and antenna with dynamic antenna tuning in which an operating frequency of a detachable antenna may be automatically detected via a detected frequency of antenna element which is separate from a main antenna of the detachable antenna, the antenna element being one or more of electrically floating and electrically decoupled from the main antenna. The frequency (e.g. a resonance frequency) of the antenna element is detected at the communication device via a second antenna element which is scanned through a range of frequencies to cause the antenna element in the detachable antenna to resonate. A detector in the communication device detects the frequency of the antenna element and may use a database (e.g. a database lookup) and/or a table to determine the operating frequency of the main antenna of the detachable antenna. Furthermore, an active tuning circuit of the communication device is tuned to the operating frequency. In some examples, a light emitting component is controlled to emit light of a given color to indicate the operating frequency of the main antenna.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A communication device comprising:
a detachable antenna comprising:
a base of electrically insulating material;
an antenna operable at a first given frequency; and
a first antenna element, at the base, operable at a second given frequency independent of the first given frequency of the antenna;
a memory storing an association between the first given frequency and the second given frequency;
an antenna port configured to detachably receive the base of the detachable antenna;
a second antenna element, at the antenna port, operable to wirelessly interact with the first antenna element when the base of the detachable antenna is received at the antenna port;
a circuit configured to detect wireless interactions between the second antenna element and the first antenna element; and
a controller configured to:
select the first given frequency from the memory using the second given frequency as detected via the circuit; and, thereafter
wirelessly communicate via the antenna operated at the first given frequency.

2. The communication device of claim 1, wherein the circuit is further configured to detect the wireless interactions between the second antenna element and the first antenna element by scanning the second antenna element over a range of frequencies, including the second given frequency.

3. The communication device of claim 1, wherein the controller is further configured to:
control the circuit to scan the second antenna element over a range of frequencies, including the second given frequency; and
detect, via the circuit, the second given frequency of the first antenna element via the wireless interactions between the second antenna element and the first antenna element.

4. The communication device of claim 1, further comprising a light emitting component, the controller further configured to:
control the light emitting component to emit a given color of light based on the second given frequency as detected via the circuit.

5. The communication device of claim 4, wherein the light emitting component is located at the antenna port.

6. The communication device of claim 4, wherein the controller is further configured to:
when the wireless interactions between the second antenna element and the first antenna element are not detected, control the light emitting component to not emit light.

7. The communication device of claim 1, wherein the memory stores respective associations between respective first given frequencies and respective second given frequencies for a plurality of detachable antennas, each comprising a respective antenna operable at a respective first given frequency, and a respective first antenna element operable at a respective second given frequency independent of the respective first given frequency of the respective antenna, the controller further configured to:
control the circuit to scan the second antenna element over a range of frequencies, including the respective second given frequencies, to detect the second given frequency; and
select the first given frequency from the respective first given frequencies stored at the memory using the second given frequency as compared with the respective second given frequencies.

8. The communication device of claim 1, wherein the first antenna element is one or more of: electrically floating and electrically decoupled from the antenna.

9. The communication device of claim 1, wherein the first antenna element comprises a coil of an electrically conducting material located at the base, the coil being concentric with a base-end of the antenna and electrically insulated therefrom via the electrically insulating material of the base.

10. The communication device of claim 1, wherein the second antenna element comprises a ring of an electrically conducting material located around an electrically insulated housing of the antenna port.

11. The communication device of claim 1, further comprising a communication unit configured to wirelessly communicate via the antenna when the base of the detachable antenna is received at the antenna port, the controller configured to wirelessly communicate via the antenna operated at the first given frequency via the communication unit.

12. The communication device of claim 11, further comprising:
a frequency generation unit; and
a switch device configured to switch an output from the frequency generation unit between the communication unit and the circuit, the controller further configured to:
control the switch device to switch the output from the frequency generation unit to the circuit when controlling the circuit to scan the second antenna element over a range of frequencies that includes the second given frequency to detect the second given frequency; and
control the switch device to switch the output from the frequency generation unit to the communication unit when controller is wirelessly communicating via the antenna at the first given frequency via the communication unit.

13. The communication device of claim 12, wherein the circuit comprises one or more of an electrical divider and an electrical multiplier to one or more of divide and multiply the output from the frequency generation unit to scan the second antenna element over the range of frequencies that includes the second given frequency.

14. The communication device of claim 11, wherein the communication unit comprises:
a transmitter/receiver circuit configured to transmit and receive data via the antenna when the base of the detachable antenna is received at the antenna port; and
an active tuning circuit, between the transmitter/receiver circuit and the antenna port, the active tuning circuit configured to be tuned to the first given frequency to enable the transmitter/receiver circuit to transmit and receive the data via the antenna at the first given frequency.

15. The communication device of claim 1, wherein the circuit comprises one or more of a reflection detector and a received signal strength intensity (RSSI) detector configured to detect one or more of electrical reflections and RSSI from the second antenna element to detect the wireless interactions between the second antenna element and the first antenna element.

* * * * *